United States Patent [19]

Okuda et al.

[11] Patent Number: 4,946,358
[45] Date of Patent: Aug. 7, 1990

[54] MOLD MOUNTING APPARATUS

[75] Inventors: Masahisa Okuda, Okazaki; Atsushi Nishimura, Aichi; Hiroaki Kitagawa, Okazaki; Koichi Kaku, Nagoya, all of Japan

[73] Assignee: Mitsubishi Jidosha Kogyo Kabushiki Kaisha, Tokyo, Japan

[21] Appl. No.: 391,317

[22] Filed: Aug. 8, 1989

[30] Foreign Application Priority Data

Aug. 29, 1988 [JP] Japan .................................. 63-212380
Aug. 29, 1988 [JP] Japan .................................. 63-212381
Aug. 29, 1988 [JP] Japan .................................. 63-212382
Aug. 29, 1988 [JP] Japan .................................. 63-212383
Aug. 29, 1988 [JP] Japan .......................... 63-112128[U]

[51] Int. Cl.⁵ .............................................. B29C 45/04
[52] U.S. Cl. ................................. 425/183; 264/297.2; 264/328.7; 264/328.8; 264/328.11; 264/328.16; 425/186; 425/190; 425/547; 425/574; 425/575
[58] Field of Search ............... 264/297.2, 328.7, 328.8, 264/328.11, 328.14, 328.16; 425/185, 190, 436 R, 444, 547, 553, 554, 556, 574, 575, 345, 186, 195, 183

[56] References Cited

FOREIGN PATENT DOCUMENTS 159026 7/1988 Japan .

Primary Examiner—Jay H. Woo
Assistant Examiner—Timothy W. Heitbrink
Attorney, Agent, or Firm—Abelman Frayne Rezac & Schwab

[57] ABSTRACT

A mold mounting apparatus having a mold holding apparatus provided on one side at the end of rails, for positioning and holding a mold; a second mold holding apparatus provided on the opposite side of clamping machines of an injection molding machine and the rails, for preheating, positioning and holding the mold in place; a mold delivery apparatus for delivering the mold to two clamping machines; and a mold carrying apparatus for receiving and delivering the mold among the mold holding apparatus, the second mold holding apparatus, and the mold delivery apparatus, and for conveying the mold along the rails. According to this mold mounting apparatus, the mold can be automatically carried into, and out of, all of the clamping machines after the mold has been brought into the mold holding apparatus, thereby improving mold changing operation efficiency and saving a space for the molding process.

10 Claims, 19 Drawing Sheets

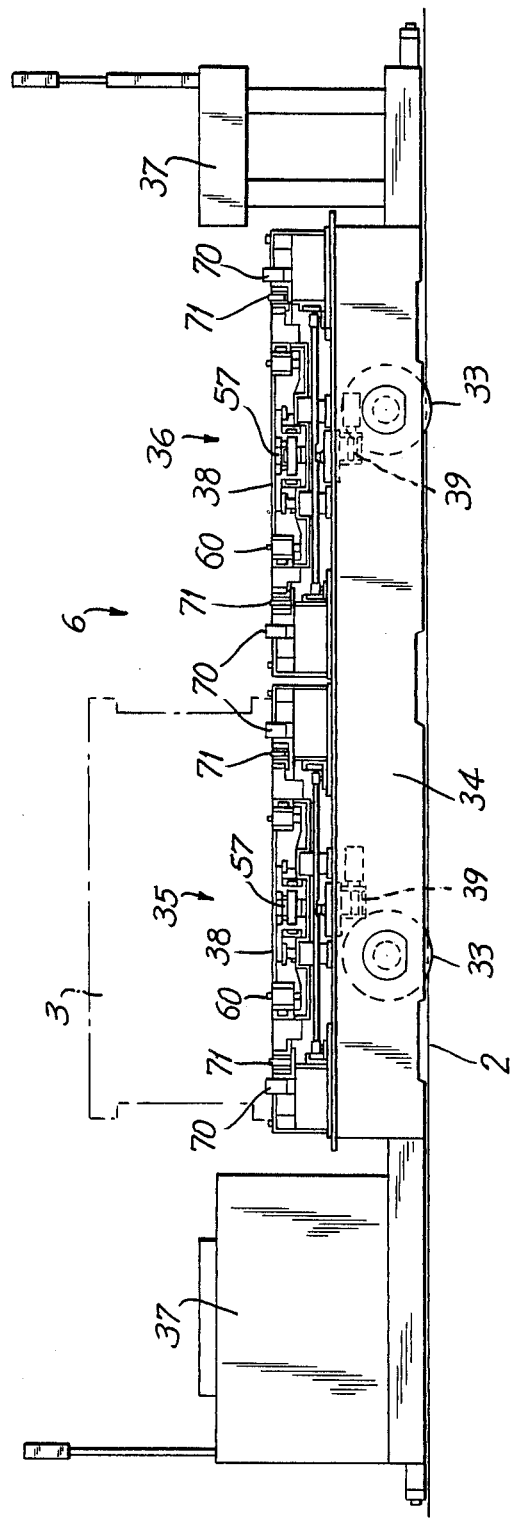

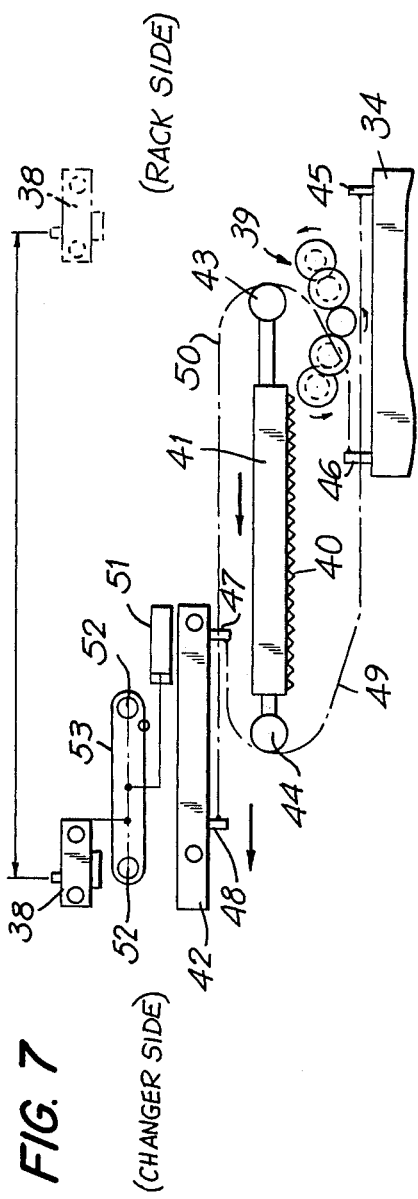
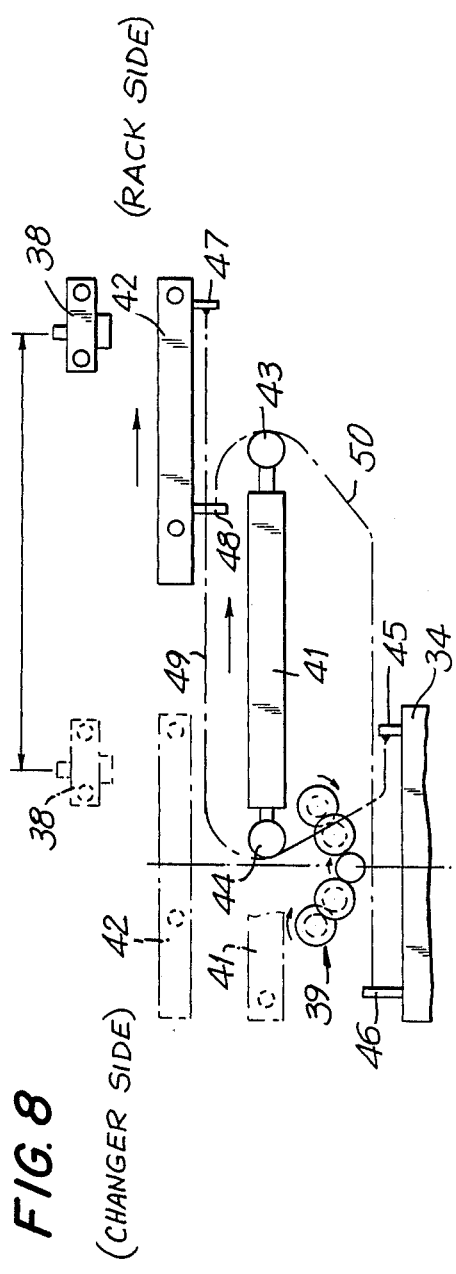

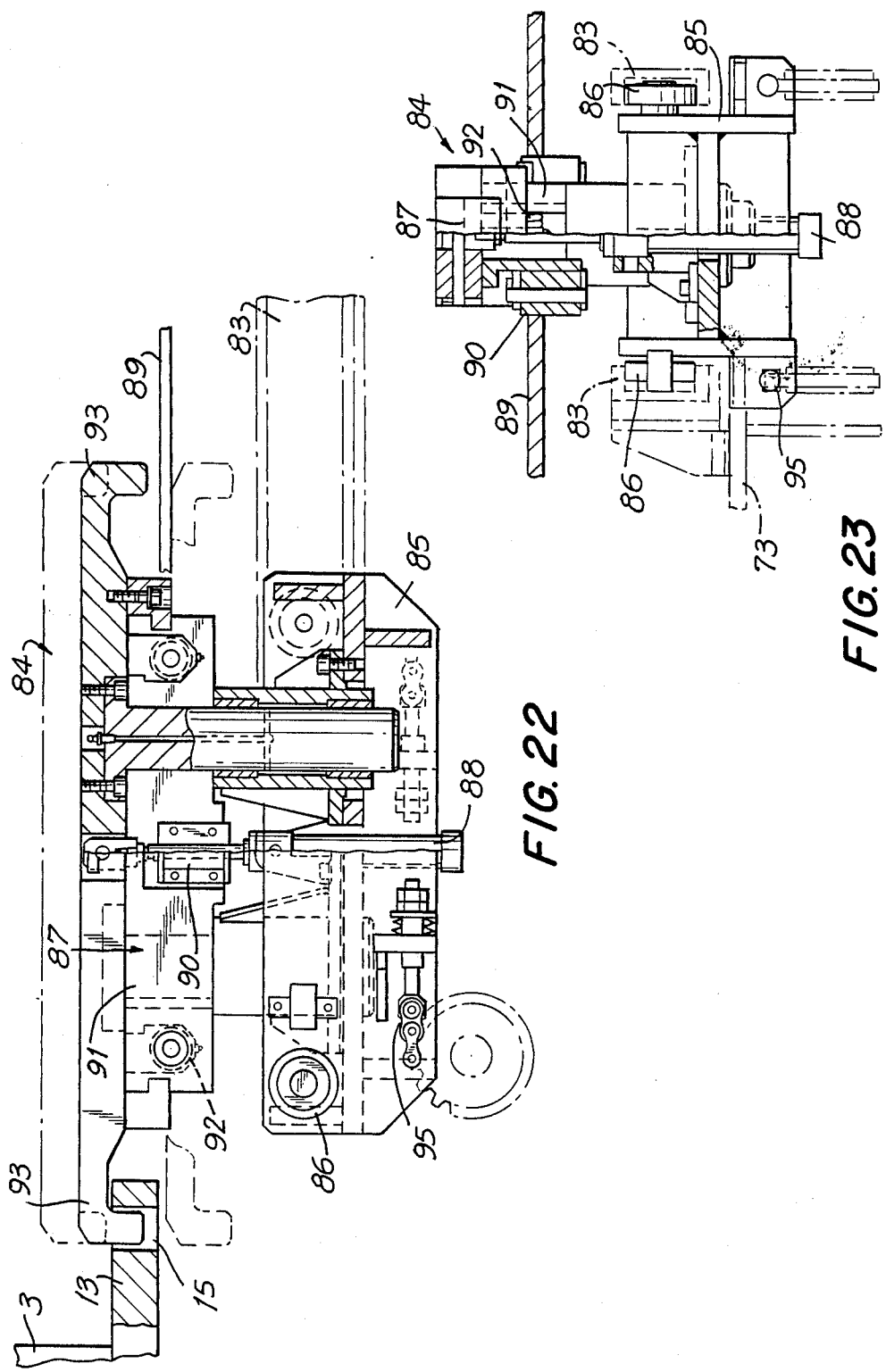

MOLD MOUNTING APPARATUS

FIELD OF THE INVENTION

The present invention relates to a mold mounting apparatus capable of automatically carrying a mold to be used in a molding operation, into and out of a molding machine.

BACKGROUND OF THE INVENTION

Plastic products, such as automotive bumpers and so forth, are produced by injection molding. The injection molding is effected by injecting a thermoplastic resin into a cavity of a closed mold. When a change is made in the type of products, the mold is also changed. According to a conventional practice, the mold is replaced by directly bringing a new mold by a forklift truck into a clamping mechanism of an injection molding machine every time the mold is changed.

An automatic mold mounting technique of the prior art in Japan has been disclosed in Laid-Open Japanese Patent Application No. 63-159026 (Japanese Patent Application No. 61-306213 filed Dec. 24, 1986).

In Laid-Open Japanese Patent Application No. 63-159026 is disclosed an automatic mold mounting apparatus having a mold carrying means designed to carry the mold into a mold plate from a mold carrier for carrying the mold to a molding machine, a means for judging the type of a mold moving into the mold plate, and a control means for stopping the movement of the mold that has been judged as a different type of mold.

Bumpers differ in shape with types of motor vehicles. A plurality of molding machines, therefore, are juxtaposed to perform the molding of a plurality of types of bumpers. According to this conventional layout of molding machines, it is necessary to drive a forklift truck in a wide range of movement to change the mold every time mold replacement is demanded, resulting in a very low operation efficiency. Moreover, it is necessary to provide wide space to allow the movement of the forklift truck to each molding machine and sufficient room for mold replacement. And naturally a large space is allotted for the molding process.

SUMMARY OF THE INVENTION

It is an object of the present invention to provide a mold mounting apparatus capable of automatically bringing a mold into, and out of, every molding machine, and changing the mold with a higher operation efficiency and with a narrower space for the molding process.

The mold mounting apparatus of the present invention that can accomplish this object, comprises a plurality of model clamping machines of injection molding machines juxtaposed in a line; rails laid along the clamping machines; a mold holding apparatus located at the side of one end of the rails, for positioning and holding a mold carried in, in a predetermined position; a second mold holding apparatus set on the opposite side of the clamping machine next to the rails, for preheating, positioning and holding the mold carried in; a mold carrying apparatus having a carrier which travels on the rails for mold receiving and delivery; and a mold delivery apparatus having mold delivery mechanisms provided one for each two clamping machines, for delivering the mold to a predetermined clamping machine from the mold carrying apparatus. The mold is then brought into the mold holding apparatus, in which the mold is set and held in place. The mold thus positioned is subsequently loaded over to the mold carrying apparatus, which in turn travels, conveying the mold to the second mold holding apparatus. The mold carrying apparatus, at the same time, receives a preheated mold from the second mold holding apparatus. Then, the mold carrying apparatus travels to unload the mold to a predetermined molding machine.

BRIEF DESCRIPTION OF THE DRAWINGS

FIG. 6 is a side view thereof;
FIGS. 7 to 10 are schematic views showing the condition in which the carrier is supported;
FIG. 22 is a side view of the traveling hook;
FIG. 23 is a front view of the traveling hook.

DETAILED DESCRIPTION OF PREFERRED EMBODIMENT

The general constitution of the present invention will be explained in detail with reference to the drawings.

Figure 1:
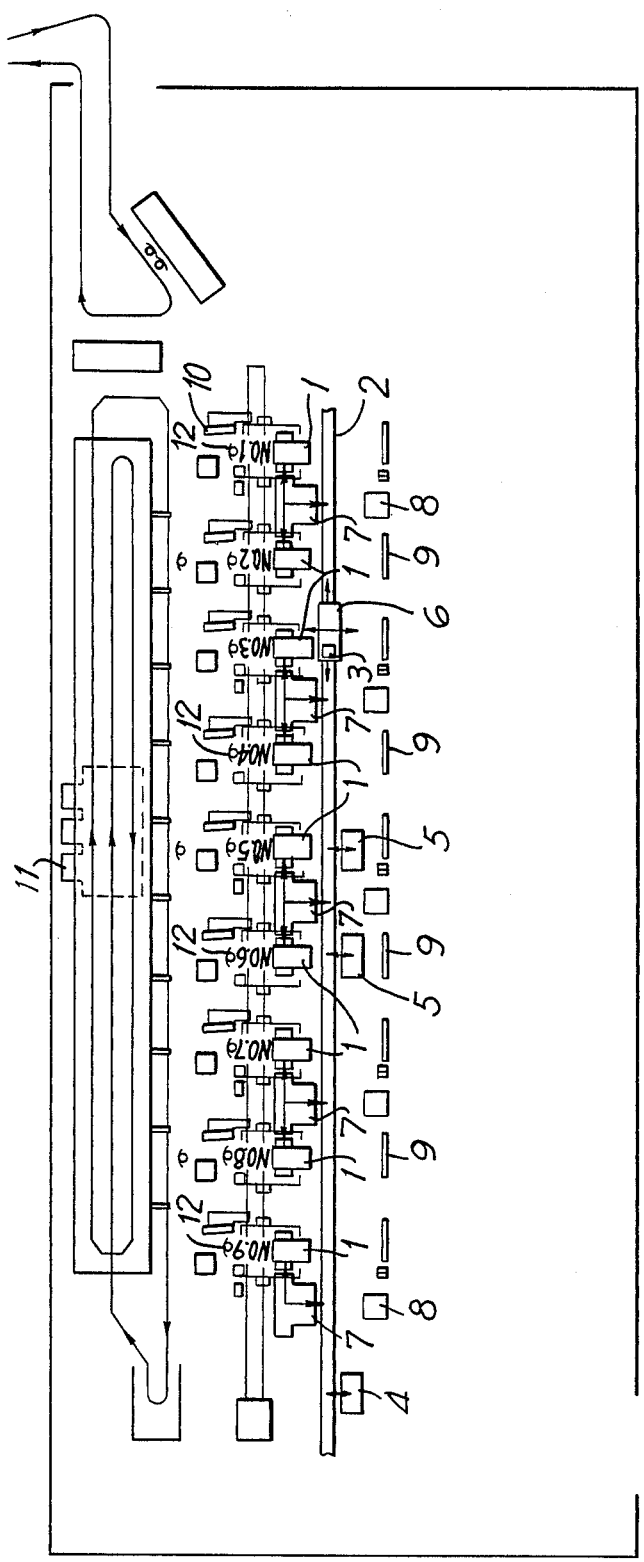
FIG. 1 is a plan view showing the general constitution of a mold mounting apparatus according to the present invention.
Figure 2:
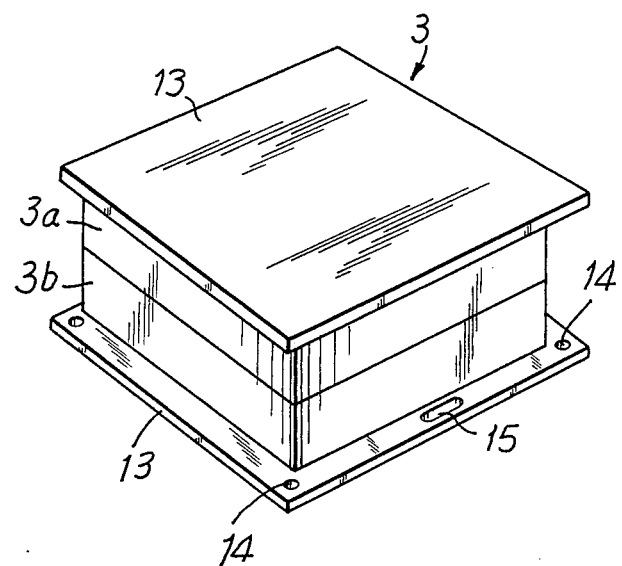
FIG. 2 is a perspective view of a mold.

In FIGS. 1 and 2, the injection molding machine is associated with nine clamping machines 1 (No. 1 to No. 9), which are juxtaposed in a straight line. Along the clamping machines 1 are laid rails 2. At the side of one end of the rails 2, there is provided a first mold rack 4 as a mold holding apparatus for temporarily reserving a mold 3. On the opposite side of the clamping machine 1 located on the way of the rails 2, two sets of second mold racks 5 as second mold holding apparatus are juxtaposed. A mold truck 6 as a mold carrying apparatus is provided, which travels on the rails 2. Also, mold changers 7 as mold delivery apparatus are furnished, one for each two clamping machines 1. (For one clamping machine 1 at either end of the injection molding machine, one molding changer 7 is assigned.) The mold truck 6 is designed to mount two sets of the mold 3 thereon. This mold truck 6 serves to perform mold receiving from, and delivery to, the first mold rack 4 and the second mold rack 5. Either of the first mold rack 4 and the second mold rack 5 is equipped with a positioning mechanism for setting the mold 3, that has been carried in, in a predetermined position. The second mold rack 5 has a preheating piping for preheating the mold 3. The mold truck 6 is also used to receive the mold 3 to, and deliver it from, the mold changer 7. This mold changer 7 has a mold delivery mechanism for receiving the mold 3 from, and delivering to, a predetermined clamping machine 1.

In FIG. 1, numeral 8 is a plastic material supply apparatus; numeral 9 denotes a control panel of the clamping machine 1; numeral 10 expresses a product check table; numeral 11 indicates an oven booth for heating rejected products; and numeral 12 is an operator.

As shown in FIG. 2, the mold 3 is a combination of an upper mold 3a and a lower mold 3b, which are both attached to mounting plates 13. Each of the mounting plates 13 is provided with fork holes 14 to be used when carrying the mold in and out, and long hook holes 15 to be used for delivering the mold.

Next, the operation of the mold mounting apparatus described above will be explained. In the second mold rack 5, a mold 3 (a first mold) to be subsequently used is held and preheated. In the mold rack 4, a mold 3 (a second mold) to be subsequently used is brought in by the forklift truck (not shown) and positioned In place The operating condition for example that a mold 3 (a third mold) is brought out of No. 2 clamping machine 1 and the first mold 3 is brought into No. 2 clamping machine 1 will be described.

The mold truck 6 is driven to move as far as the position of the first mold rack 4, from which the second mold 3 is received to one side of the mold truck 6. Then, the mold truck 6 is moved to the position of the second mold rack 5, and receives, on the other side thereof, the first mold 3 that has been preheated. At the same time, the mold truck 6 brings the second mold 3 from one side thereof in to the second mold rack 5. Subsequently, the mold truck 6 is moved to the position of the mold changer 7 located beside No. 2 clamping machine 1, receiving the third mold 3 that has been used, on one side thereof and delivering the first mold 3 from the other side thereof to the mold changer 7. The first mold 3 that has been carried in to the mold changer 7 is delivered to No. 2 clamping machine 1 by the delivering mechanism of the mold changer 7. The mold truck 6 carrying the third mold 3 on one side thereof travels to the position of the first mold rack 4, where the third mold 3 is unloaded from the mold truck 6 to the first mold rack 4. To carry the third mold 3 from the first mold rack 4, a forklift truck not shown is used. Hereafter the replacement of the mold 3 of No. 1 to No. 9 clamping machines is performed in a similar manner by the use of the mold truck 6. The above-described operations are controlled separately or concentratedly, automatically bringing the molds in and out automatically.

According to the above-described mold mounting apparatus, the mold truck 6 is operated to bring the mold 3 into the first mold rack 4, enabling the automatic unloading of the mold 3 to the clamping machine 1 side and, at the same time, the automatic take-out of a used mold 3 to the first mold rack 4. Furthermore, the provision of the second mold rack 5 enables the preheating of the mold 3 to be subsequently used, and accordingly molding operation can be started immediately after the replacement of the mold 3.

It is possible to automatically bring a mold into, and out of, every molding machine by using the mold holding apparatus, and also to automatically bring a preheated mold into the molding machine, thereby attaining an improved operation efficiency of mold replacement and reduction of space for the molding process. Accordingly, molding operation can be started immediately after mold replacement, thus further improving operation efficiency.

Figure 3:
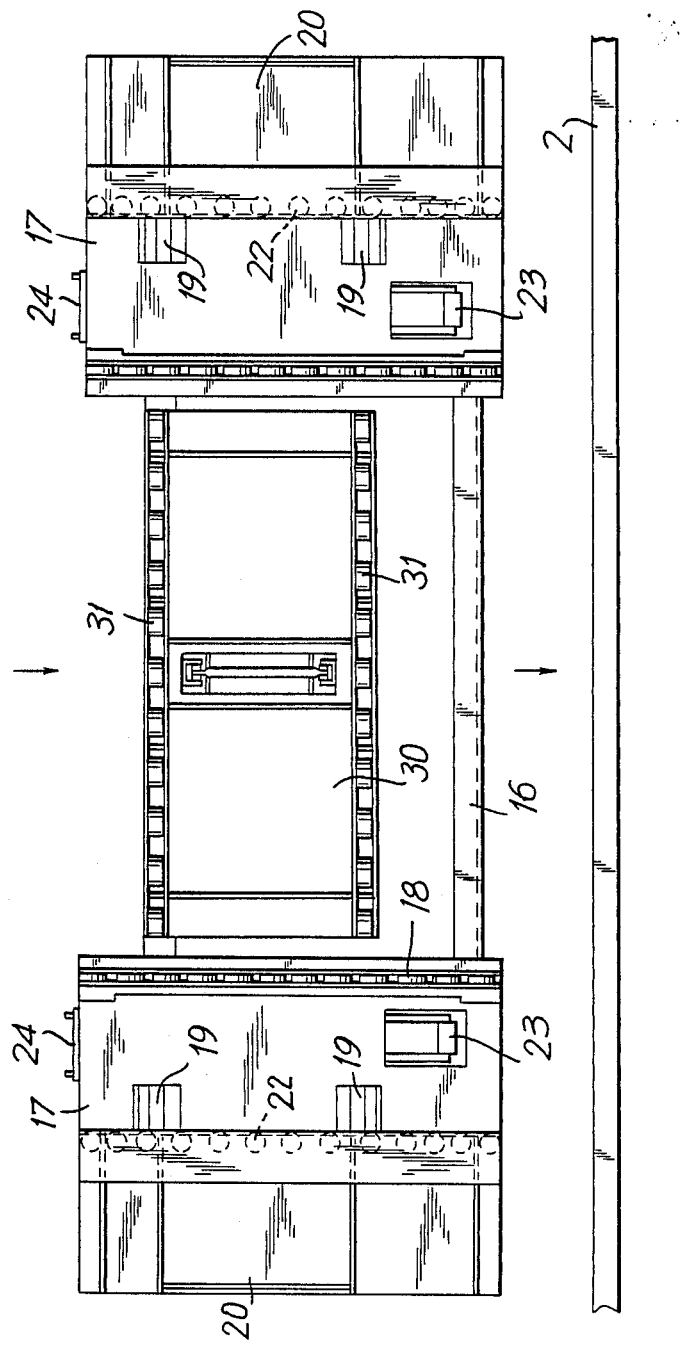
FIG. 3 is a plan view of a mold rack.
Figure 4:
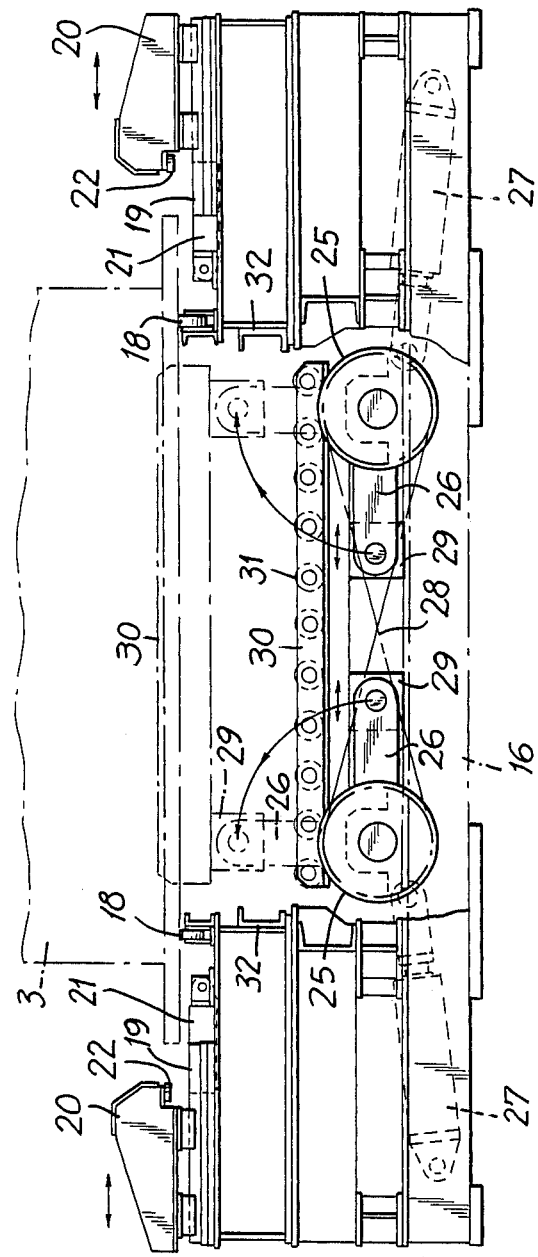
FIG. 4 is a partly broken side view thereof.

Next, the constitution of the first mold rack 4 will be described by referring to FIGS. 3 and 4. The second mold rack 5, being of the identical construction, will not be particularly set forth. FIG. 3 is a plan view of the mold rack, and FIG. 4 is a side view, partly broken, thereof.

At either end of a bed 16, a fixed base 17 is provided. On the top of this fixed base 17 is supported a guide roller 18. Furthermore, rails 19 are laid on the top of the fixed base 17, extending along the same direction of the rails 2. On the rails 19 are slidably supported centering devices 20, which are both moved toward, and away from, each other by hydraulic cylinders 21. Each centering device 20, having the same sliding stroke, constitutes a positioning mechanism. The centering device 20 has a guide roller 22 at the front end. On the rail 2 side (FIG. 3: in the lower part, on the other side) of the top of the fixed base 17, a movable stopper 23 is mounted. This movable stopper 23 is designed to be moved in and out by a hydraulic cylinder which is not shown. Also, on the opposite side of the rails 2 (FIG. 3: at the top, on one side) on the top of the fixed base 17, a stopper 24 is fixedly mounted.

Between the fixed bases 17, a bed 16 is provided. In the vicinity of each of these fixed bases 17 o the bed 16, rotating discs 25 are mounted, each rotating around the horizontal axis intersecting at right angles with rails 19. The rotating discs 25 have rotating levers 26 respectively, which are mounted opposite to each other. On each of the rotating discs 25 is supported a cylinder rod of the lifting cylinder 27. As the lifting cylinder 27 is driven, the rotating disc 25 seen at the right side in FIG. 4 rotates counterclockwise, while the rotating disc on the left in FIG. 4 rotates clockwise, thus setting the rotating levers 26 in a perpendicular position. The lifting cylinders 27 are driven simultaneously to rotate the rotating discs 25 simultaneously in opposite directions by a crossed endless chain 28. At the end of each of the rotating levers 26, a moving piece 29 is rotatably provided. This moving piece 29 slidably supports the bottom of a moving base 30, in relation to the horizontal direction (in the longitudinal direction) intersecting at right angles with the center of rotation of the rotating discs 25. That is, with the rotation of the rotating discs 25, the rotating levers 26 swing upwardly to slide the moving pieces 29 on the bottom of the moving base 30 in the directions in which the moving pieces 29 move away from each other, thus raising the moving base 30.

The lifting mechanism of the moving base 30 is not to be limited to the above described embodiment.

On the top surface of the moving base 30, rollers 31 longitudinally movably supporting the mold 3 are provided. In the drawing, numeral 32 denotes a guide groove along which the carrier of the mold truck 6 described later is guided. The mold 3 is carried in from above in FIG. 3 by a forklift truck and carried out from the lower part in FIG. 3 by the mold truck 6.

Next, the operation of the mold rack of the aforesaid constitution will be explained. With the moving stoppers 23 moved fully out where they will be in contact with the mold 3, the mold 3 is carried in on the forklift truck, and unloaded on the guide rollers 18 of the fixed base 17. After unloading the mold 3, the forklift truck withdraws. At this time, the stoppers 24 Then, the lifting cylinders 27 are driven to rotate the rotating discs 25, and the rotating levers 26 turn to raise the moving base 30 through the moving pieces 29, holding the mold 3 on the rollers 31. Next, the hydraulic cylinders 21 are operated to move the centering devices 20 for the same stroke in the direction in which they approach each other. The mold 3 is hold in the predetermined longitudinal direction. The hydraulic cylinders 21 are driven to move the centering devices 20 away from each other and the lifting cylinders 27 are operated to turn the rotating discs 25 in opposite directions, lowering the moving base 30. Hence, the mold 3, in the state that it is properly positioned in the longitudinal direction thereof, is supported on the guide rollers 18 of the fixed base 17, and is carried downwardly in FIG. 3, by the mold truck 6.

The moving base 30 is moved upwardly and, with the mold 3 mounted on this moving base 30, the longitudinal position of the mold 3 is set by the centering devices 20. Then, the moving base 30 is lowered to set the mold on the fixed base 17. The above-mentioned mold rack, therefore, can properly set and hold the mold 3 carried in by the forklift truck, in a predetermined position.

Since the mold is mounted on the fixed base, the moving base is moved upwardly to position the mold in the width direction by the centering mechanism, and then, the moving base is lowered to properly position the mold on the fixed base, this constitution enables easy construction of the mold mounting apparatus.

The constitution of the mold truck 6 will be described with reference to FIGS. 5 to 18.

Figure 5:
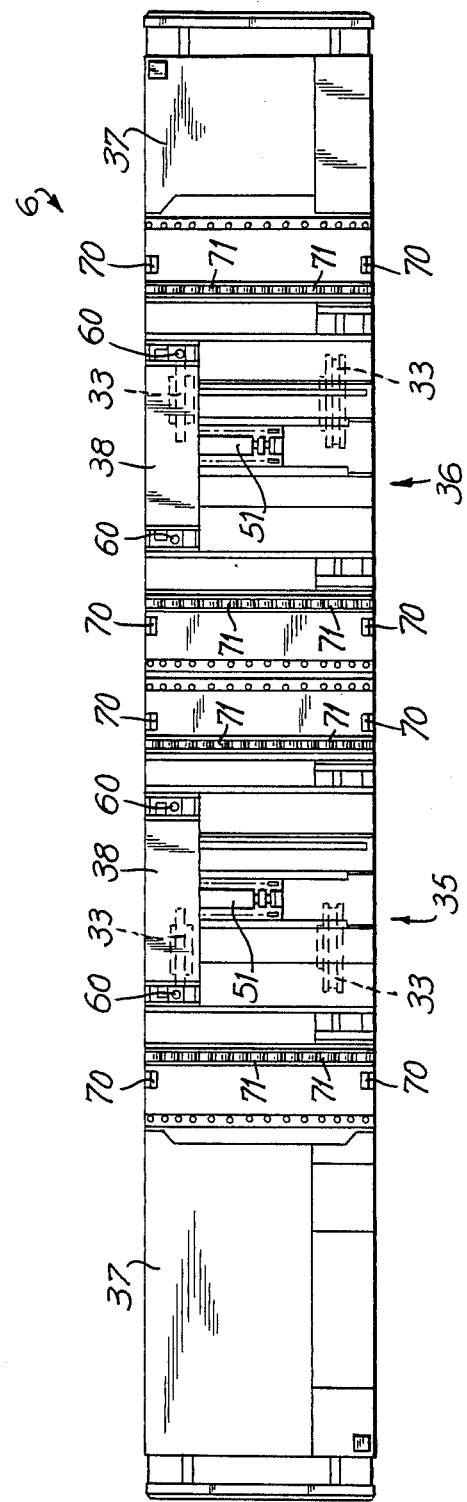
FIG. 5 is a plan view of a mold truck.

FIG. 5 is a plan view of the mold truck, and FIG. 6 is a side view thereof.

On the rails 2 is supported a vehicle body 34 through driving wheels 33. The vehicle body 34 is mounted with a first holding station 35 and a second holding station 36 for holding the mold 3. At the front and rear ends of the vehicle body 34 are provided control apparatus 37 for controlling the operation of the mold truck 6. The first holding station 35 and th second holding station 36 have a carrier body reciprocally movable in a horizontal direction (in FIG. 5, a vertical direction: lateral direction) perpendicular to the direction of travel of the vehicle body 34. Stoppers 70 are provided in the top side sections of the first holding station 35 and the second holding station 36. On the top of these stations are also provided guide rollers 71 juxtaposed in the lateral direction.

Next, the condition that the carrier body is supported on the vehicle body 34 will be outlined with reference to FIGS. 7 to 10.

As shown in FIGS. 7 and 8, the vehicle body 34 is provided with a pinion train 39 which is driven by a hydraulic motor. Pinions of this pinion train 39 are in mesh with a rack 40 provided on the bottom of a first fork 41 movable in the lateral direction. On the vehicle body 34 is removably supported a second fork 42 in the direction of vehicle breadth, and at both ends of the first fork 41 are provided a first sprocket 43 and a second sprocket 44. At both ends of the top of the vehicle body 34 are mounted a first anchor 45 and a second anchor 46. Also at both sides of the bottom of the second fork 42 are provided a third anchor 47 and a fourth anchor 48. Between the first anchor 45 and the third anchor 47, a first chain 49 wound around the second sprocket 44 is connected. Also between the second anchor 46 and the fourth anchor 48 is connected a second chain 50 wound around the first sprocket 43.

As the pinion train 39 is driven to move the first fork 41, the second fork 42 also moves in the same direction as the first fork 41 through the first sprocket 43, the second sprocket 44, the first chain 49, and the second chain 50.

On the second fork 42, the body of a cylinder 51 is fixed mounted, and a pair of third sprockets 52 are mounted on a cylinder rod of the cylinder 51. On the pair of the third sprockets 52, a third endless chain 53 is wound, being fixed at one point on the top of the second fork 42 and at one point o the bottom of the carrier 38. In FIG. 7, the carrier 38 is at the extreme left end (on the mold changer 7 side), and FIG. 8 shows the carrier 38 at the extreme right end (on the mold rack side). The purpose of provision of the first chain 49 and the second chain 50 between the vehicle body 34 and the second fork 42 is to prevent the chain from slacking when the second fork 42 is longitudinally moved.

Figure 9:
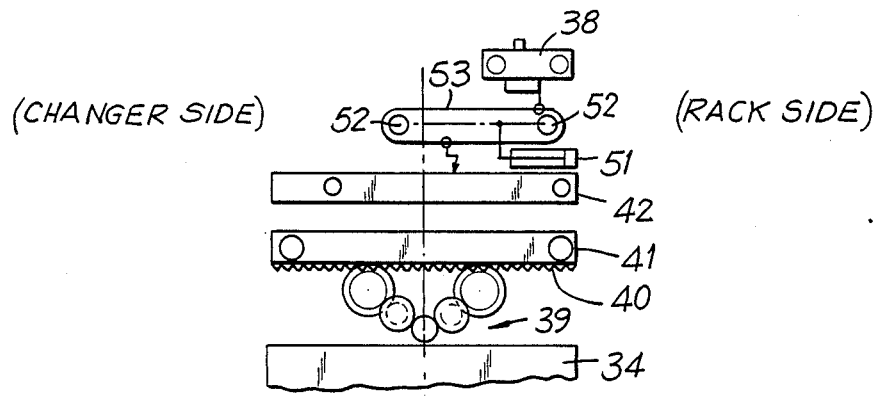
Figure 10:
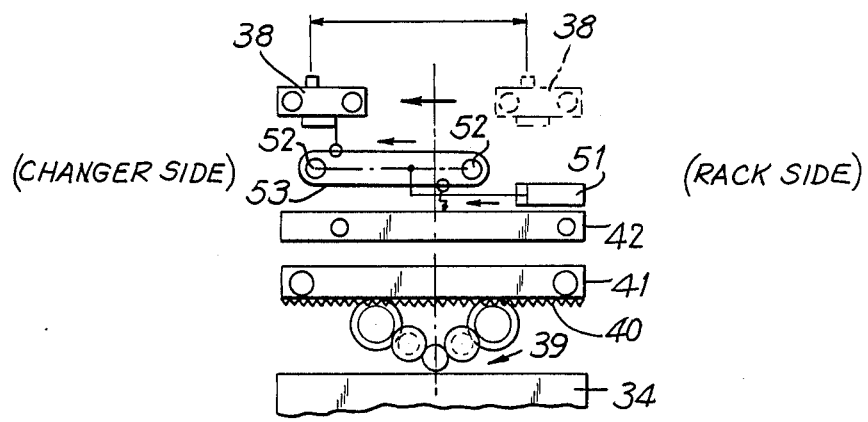

During normal operation, as shown in FIG. 9, the carrier 38 is positioned on the right side (on the mold rack side) and is allowed to move only to the left side (toward the mold changer 7 side). As shown in FIG. 10, a pair of third sprockets 52 is moved to the left by the operation of the cylinder 51, and the third chain 53 turns to move the carrier 38 to the left for the same amount of stroke of the cylinder 51 plus the movement of the third chain 53.

Next, the concrete constitution of the first holding station 35 will be described by referring to FIGS. 11 to 15. The constitution of the second holding station 36, being identical to that of the first holding station 35, will not be described herein.

Figure 11:
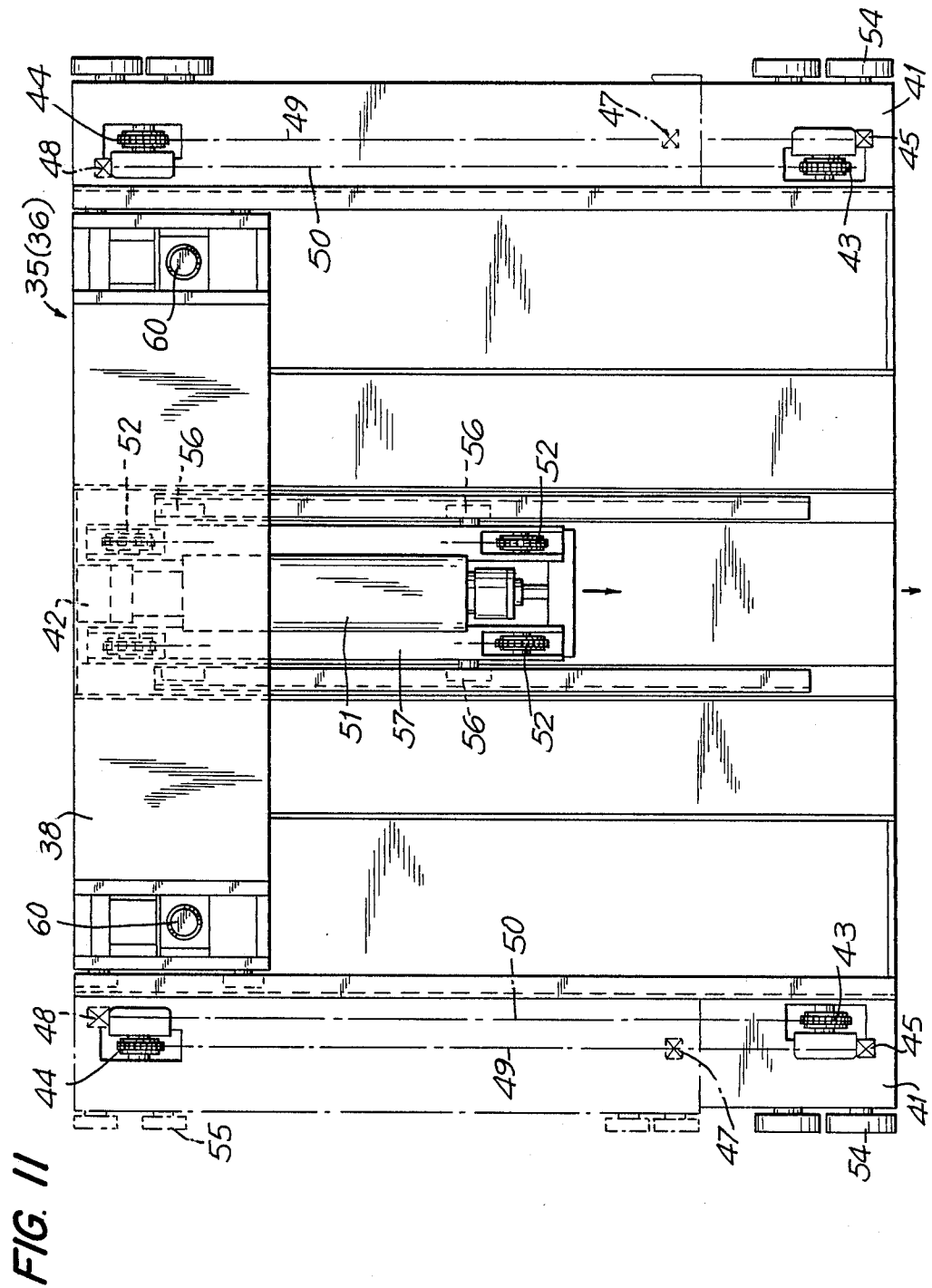
FIG. 11 is a plan view of a first holding station.
Figure 12:
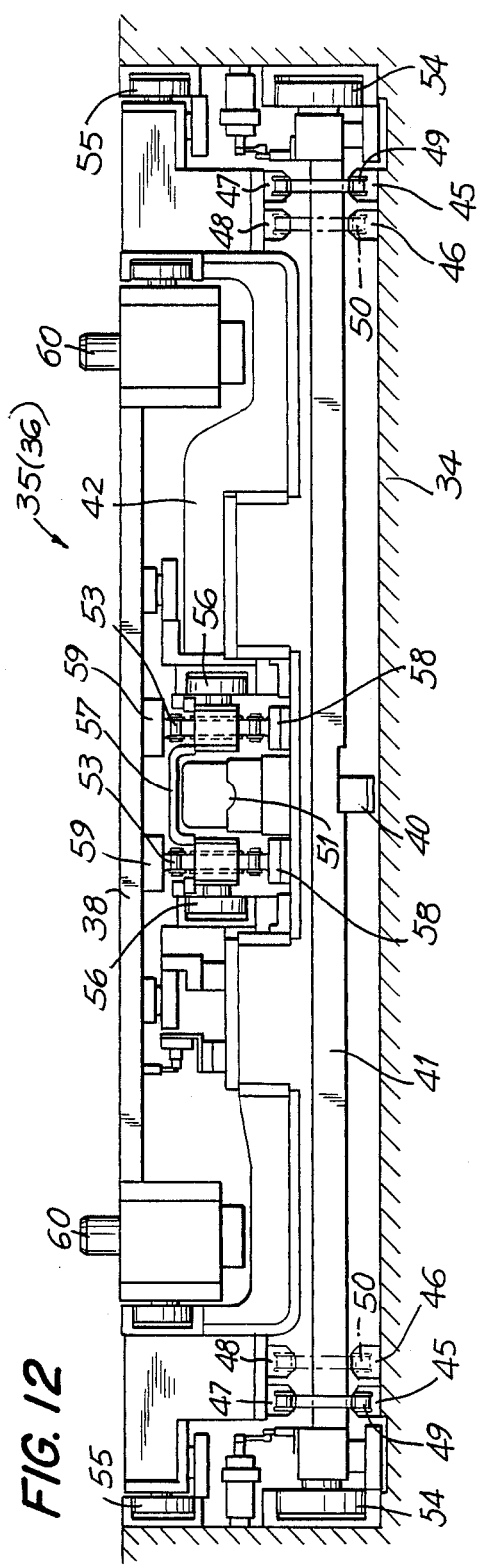
FIG. 12 is a sectional side view thereof.
Figure 13:
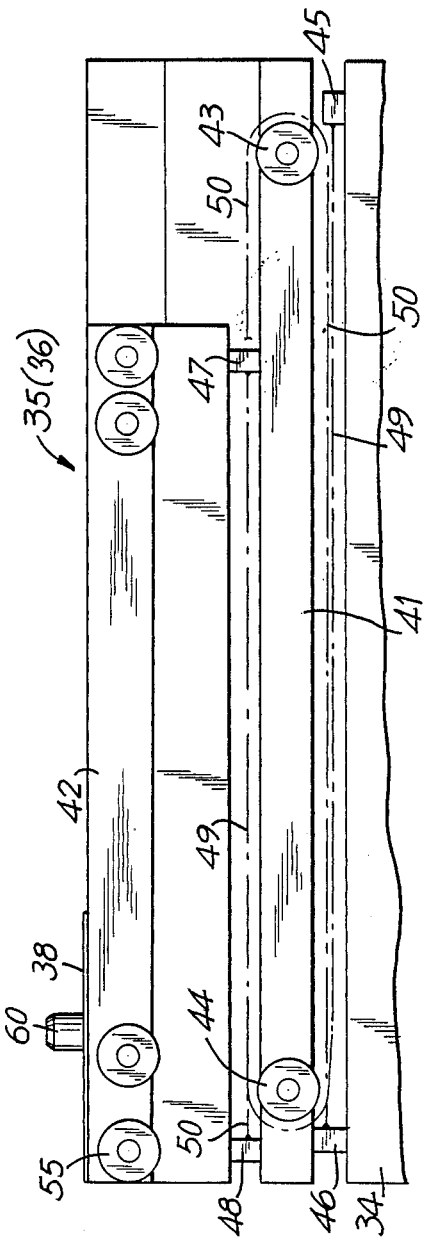
FIG. 13 is a front view thereof.
Figure 14:
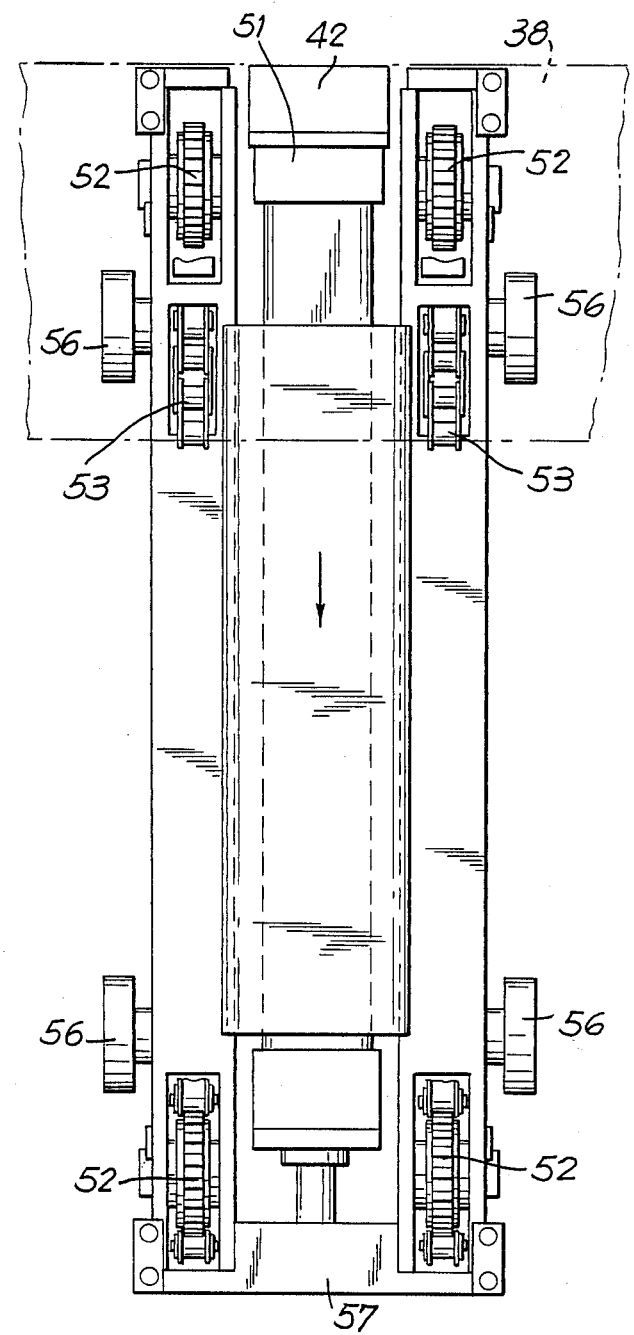
FIG. 14 is a plan view of a carrier support section thereof.
Figure 15:
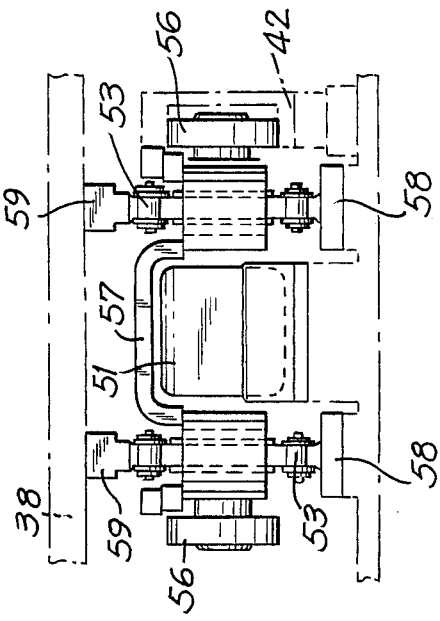
FIG. 15 is a side view thereof in FIG. 14.

FIG. 11 is a plan view of the first holding station;
FIG. 12 is a sectional side view thereof; FIG. 13 is a front view thereof; FIG. 14 is a plan view showing a carrier support section thereof; FIG. 15 is a side view of the carrier support section in FIG. 14; and FIG. 16 is a front view of the carrier support section in FIG. 14.

On the vehicle body 34 is laterally movably supported the first fork 41 through the first roller 54. On the bottom of the first fork 41 is mounted the rack 40 extending laterally. At both ends of the first fork 41, the first sprocket 43 and the second sprocket 44 are provided. Above the first fork 42 on the vehicle body 34, the second fork 42 is laterally movably supported through the second roller 55. Near both ends of the top of the vehicle body 34, the first anchor 45 and the second anchor 46 are provided. Also, near both ends of the bottom of the second fork 42, the third anchor 47 and the fourth anchor 48 are provided. Between the first anchor 45 and the third anchor 47, the first chain 49 wound on the second sprocket 44 is connected (as indicated by an alternate long and short dash line in FIGS. 11 and 13). Also between the second anchor 46 and the fourth anchor 48, the second chain 50 wound on the first sprocket 48 is connected (as indicated by the alternate long and two short dashes line).

As shown in FIG. 14, the body of the cylinder 51 is fixed on the second fork 42. On the cylinder rod of the cylinder 51 is provided a case 57 through a third roller 56 in the direction of breadth of the vehicle body 34. The case 57 supports two sets of a pair of the third sprockets 52, a pair of the third sprocket 52 being wound around with a third endless chain 53.

Figure 16:
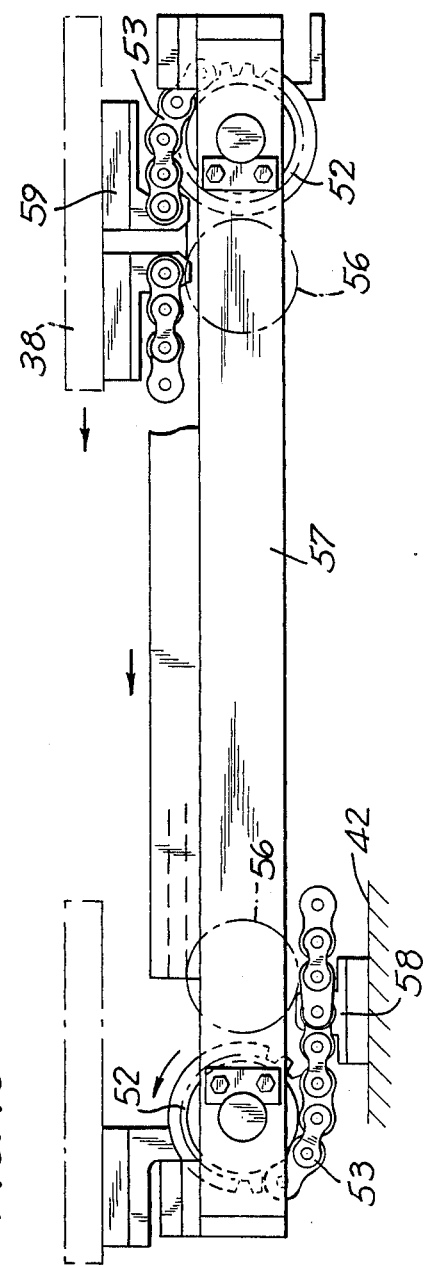
FIG. 16 is a front view thereof in FIG. 14.

As shown in FIG. 16, the second fork 42 has a fifth anchor 58 installed on the surface facing the third chain 53. The fifth anchor 58 is secured at one point of the third chain 53. Also, the carrier 38 has a sixth anchor 59 on the surface facing the third chain 53. The sixth anchor 59 is fixed at one point of the third chain 53. As shown in FIGS. 11, 12 and 13, fork pins 60 are provided at two points on the top of the carrier 38, each being designed to be moved in and out by a hydraulic mechanism not illustrated. The fork pins 60 are adapted to fit in the fork holes 14 formed in the mounting plate 13 of the mold 3.

Figure 17:
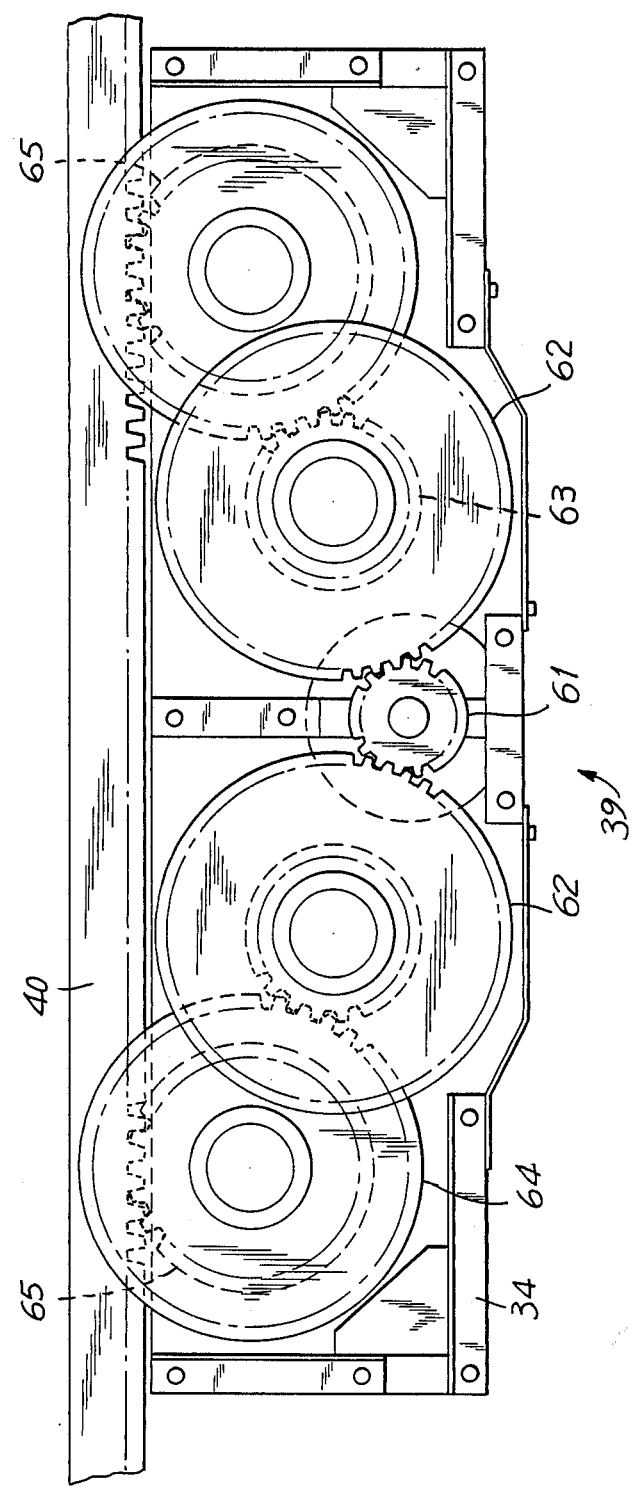
FIG. 17 is an enlarged view of a pinion set.

FIG. 17 shows the pinion train 39 in an enlarged state.

The drive gear 61 which is driven by the hydraulic motor is in mesh with a pair of first gears 62. Each of the first gears 62 is coaxially provided with a reduction gear 63. Each reduction gear 63 is in mesh with the second gear 64. Each of the second gears 64 is coaxially provided with a pinion 65. Each pinion 65 is in mesh with the rack 40. That is, the pinion 65 is rotated in the same direction by the hydraulic motor through the drive gear 61, the first gear 62, the reduction gear 63 and the second gear 64, moving the first fork 41 laterally through the rack 40.

Figure 18:
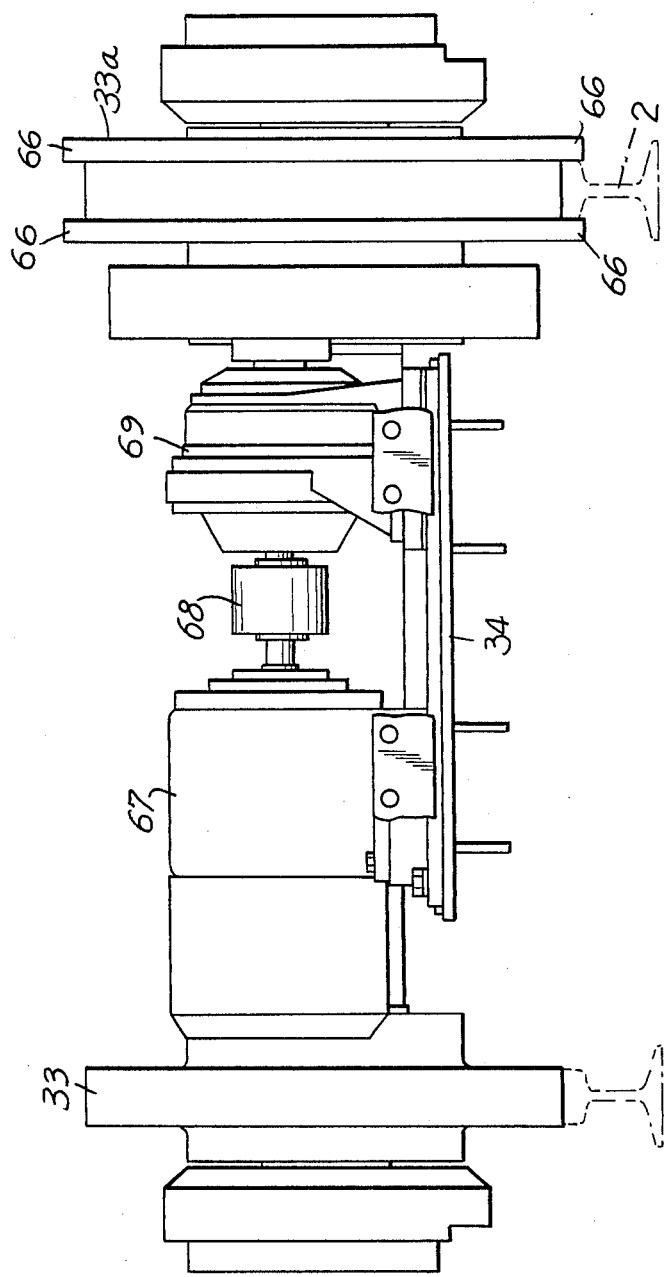
FIG. 18 is an enlarged view of a driving wheel.

FIG. 18 shows the driving wheel 33 in an enlarged state.

A driving wheel 33a on one side is formed integral with a flange section 66 on the outer periphery, riding astride the head of the rail 2. The flange section 66 may be made separately in a ring-like form and fastened by bolts or the like to the driving wheel 33a. In the drawing, numeral 67 denotes a driving motor; numeral 68 is a coupling; and numeral 69 indicates a reduction gearing. Since the driving wheel 33a is provided with the flange section 66 riding astride the head of the rail 2, the wheel can properly roll on along the rail 2 without getting derailed from the rail. Accordingly the vehicle body 34 can travel with stability on the rail 2.

Sensors are provided on a floor not shown on which the vehicle body 34 and the rails 2 are mounted. A signal from the sensors on the floor is detected by a sensor on the vehicle body 34 to control the movement of the vehicle body 34. This movement control is effected for the purpose of controlling a stop position, a deceleration position, and the direction of travel of the vehicle body 34 unattended.

The operation of the mold truck 6 described above will be explained below.

As the driving wheel 33 is driven by the driving motor 67, the vehicle body 34 is driven in accordance with a predetermined operation pattern. For example, when the mold 3 is received from the first mold rack 4, the first fork 41 is moved toward the first mold rack 4 side through the pinion train 39 and the rack 40 and the second fork 42. Thus the carrier 38 fits in the guide groove 32 of the first mold rack 4, coming under the mold 3. The fork pins 60 are moved out into the fork holes 14 of the mounting plate 13, and move the first fork 41 back to the original position through the pinion train 39 and the rack 40. Therefore, the second fork 42 returns to the original position, and the mold 3 together with the carrier 38 come onto the vehicle body 34. Delivery of the mold 3 over to the first mold rack 4 (the second mold rack 5) is effected by reversing the procedure described above. Next, the driving wheel 33 is driven to move the vehicle body 34 loaded with the mold 3, to the predetermined position of the mold changer 7.

When the case 57 is driven laterally by the cylinder 51, the third sprocket 52 is moved by the third chain 53 to slide the carrier 38 toward the mold changer 7, in relation to the second fork 42. As the first fork 41 is moved toward the mold changer 7 through the pinion train 39 and the rack 40, the second fork 42 moves in the same direction, and unloads the mold 3 on to the mold changer 7. The fork pins 60 are fully withdrawn, allowing the return of the carrier 38, the first fork 41 and the second fork 42 to their original positions. The mold 3 is received from the mold changer 7 by reversing the procedure described above. Since the first holding station 35 and the second holding station 36 are provided with stoppers 70 and guide rollers 71, the mold 3 can be moved and stopped smoothly.

The mold truck 6 described above is provided with the fork pins 60 which can be moved into, and withdrawn from, the carrier 38, enabling the reciprocal movement of the carrier 38 in the lateral direction of the vehicle. The mold 3, therefore, can automatically be received from, and delivered to, the first mold rack 4 (the second mold rack 5) and the mold changer 7. Also, the pinion train 39 is driven to move the first fork 41, thus moving the second fork 42 by the chain, and furthermore the cylinder 51 and the third chain 53 are driven to move the carrier 38. It is, therefore, possible to provide a sufficient space for the stroke of the carrier 38 in relation to the vehicle body 34 without using a larger mechanism. This enables automatic handling of molds between the mold holding apparatus and the molding machines, and easy building of the molding mounting apparatus. The driving mechanism which drives the carrier 38 in the lateral direction of the vehicle body is not to be limited only to the above-mentioned embodiment, but other types of driving mechanisms are also usable.

The constitution of the mold changer 7 will be explained with reference to FIGS. 19 to 24.

Figure 19:
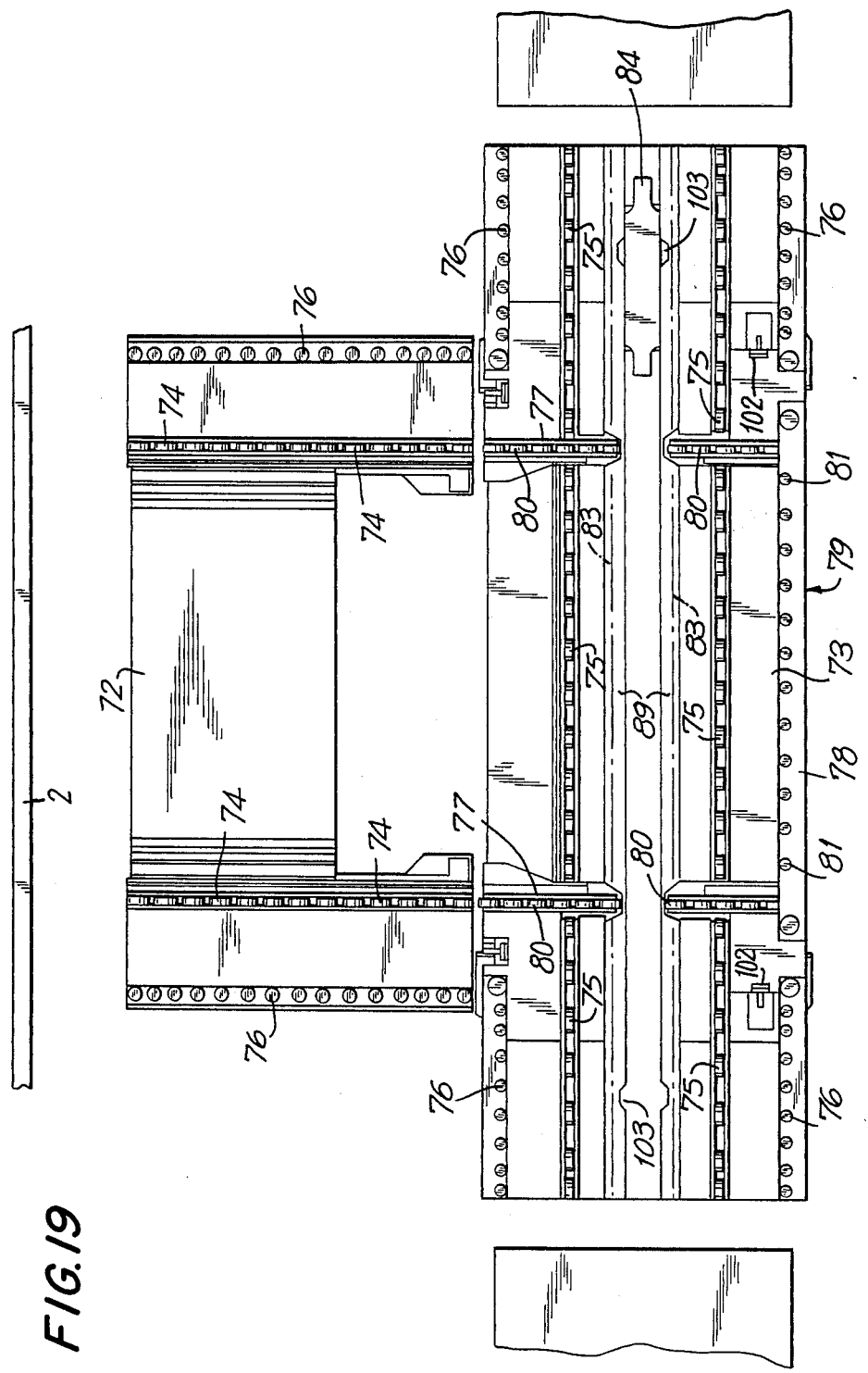
FIG. 19 is a plan view of a mold changer.
Figure 20:
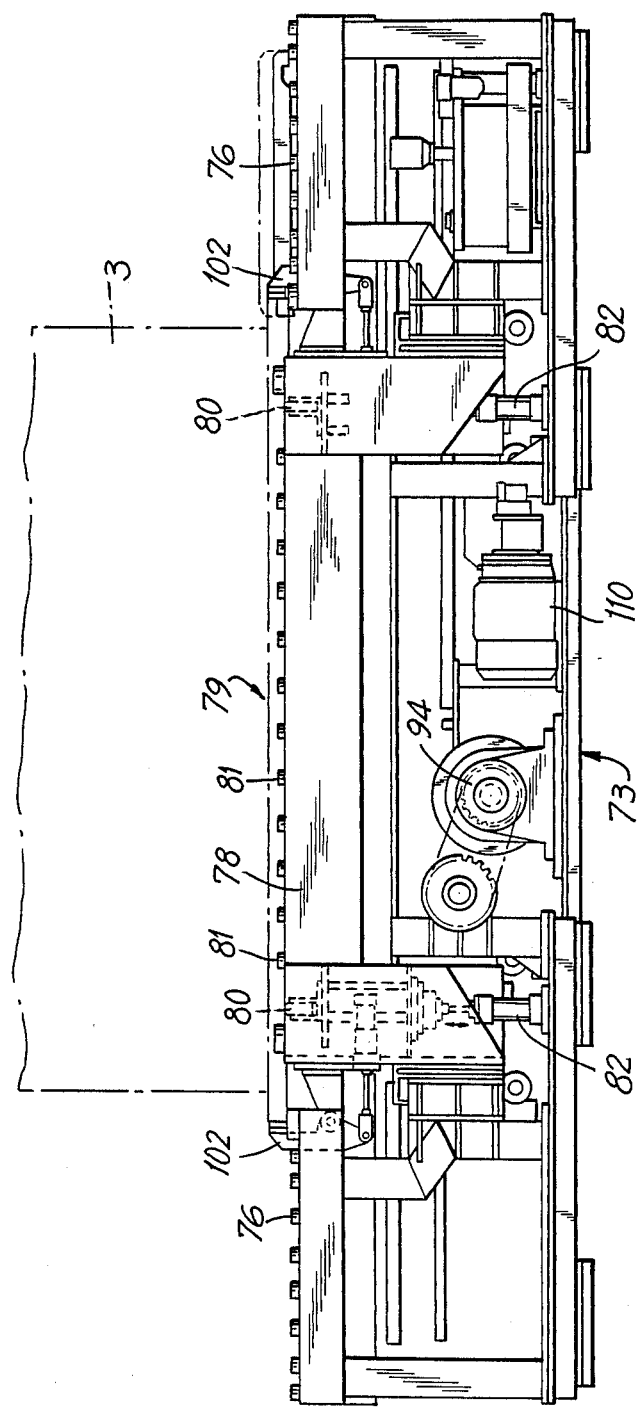
FIG. 20 is a side view thereof.
Figure 21:
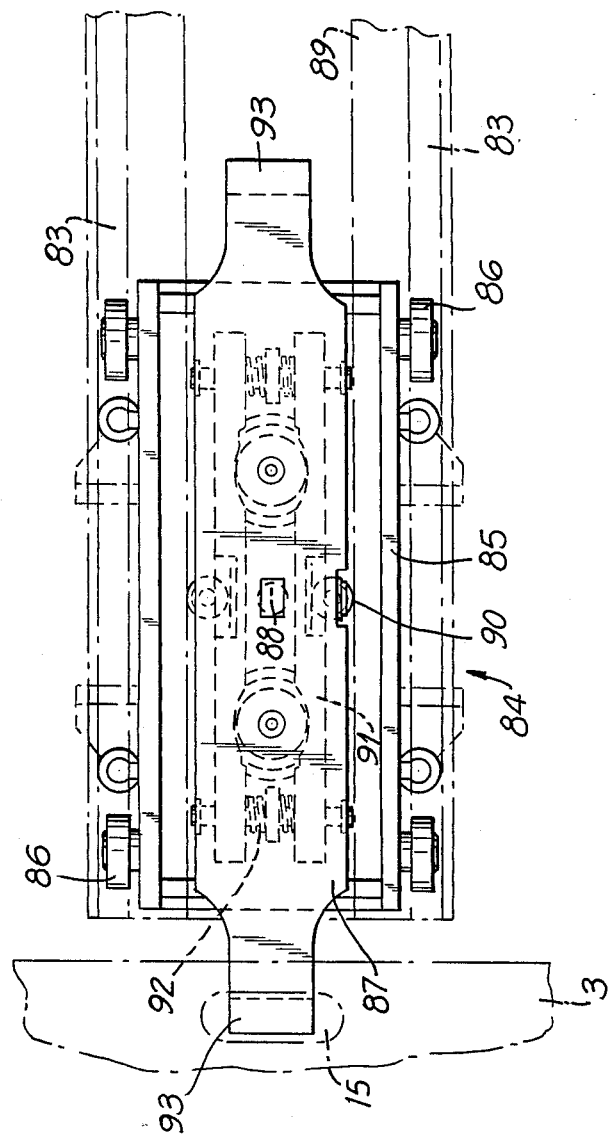
FIG. 21 is a plan view of a traveling hook.

FIG. 19 is a plan view of the mold changer; FIG. 20 is a side view thereof; FIG. 21 is a plan view of hooks; FIG. 22 is a side view of the hooks; FIG. 23 is a front view of the hooks; and FIG. 24 explains the operation of the hook body.

As shown in FIGS. 19 and 20, a first mold receiving table 72 is located adjacently to the rails 2. On the opposite side of the rails 2, that is, on the other side of the first mold receiving table 72, a second mold receiving table 73 is located. At both ends of the second mold receiving table 73 are placed the clamping machines 1. On the top of the first mold receiving table 72, first guide rollers 74 are provided for guiding the mold 3 in a direction crossing at right angles with the rails 2. On the top of the second mold receiving table 73, second guide rollers 75 for guiding the mold 3 in a direction along the rails 2 are provided. In this drawing, rollers 76 and first guide rollers 74 guide the mold 3 on the second guide rollers 75.

The second receiving table 73 has rails 77 laid in alignment with the first guide roller 74. At the end of the rails 77 on the opposite side of the first mold receiving table 72, there is installed a frame 78. The framework 79 as a guide member is constituted of rails 77 and a frame 78. On the top of the rails 77, the third guide rollers 80 are provided, such that the first guide rollers 74 and the third guide rollers 80 are connected. The mold 3 that has been moved in on the first guide rollers 74 and the third guide rollers 80 comes into contact with the stopper rollers 81, being positioned on the second mold receiving table 73. The framework 79 is vertically movably supported on the second mold receiving table 73 and driven to move up and down by means of four lift cylinders 82. In the drawing, numeral 110 denotes a hydraulic unit for the lift cylinder 82. Between the second roller guides 75 for the second mold receiving table 73 are provided guide grooves 83 extending along the same direction as the rails 2. In these guide grooves 83 are movably supported hooks 84 as a delivery mechanism. In the drawing, numeral 102 is a centering stopper for positioning the mold 3 in the direction along the second guide roller 75.

Next, the constitution of the hook 84 will be explained with reference to FIGS. 21 to 23.

In the guide grooves 83, a carriage 85 is movably mounted through rollers 86. The carriage 85 supports a hook body 87 vertically movable through two guide columns. The hook body 87 is driven to move up and down by the air cylinder 88. Above the guide grooves 83 are mounted guide rails 89, on which side rolls 90 of the hook body 87 are supported. Side plates 91 supporting the side rolls 90 are each pressed by springs 92 toward the guide rails 89, the side rolls 90 thus pressed being supported on the guide rails 89. The hook body 87 is provided, at both ends, with hook sections which fit from above into long hook holes 15 provided in the mounting plate 13 of the mold 3. In FIG. 19, numeral 103 denotes a groove section provided in the guide rails 89. When the side roll 90 is positioned in this groove section 103, the hook body 87 can be moved downwardly below the guide rails 89 or upwardly to the position of the guide rails 89.

Beneath the second mold receiving table 73, there is provided a hook driving motor 94. A driving chain 95 driven by the hook driving motor 94 is connected to the carriage 85 of the hook 84, so that the hook 84 will be driven by the drive chain 25 to slide along the guide grooves 83.

Figure 24:
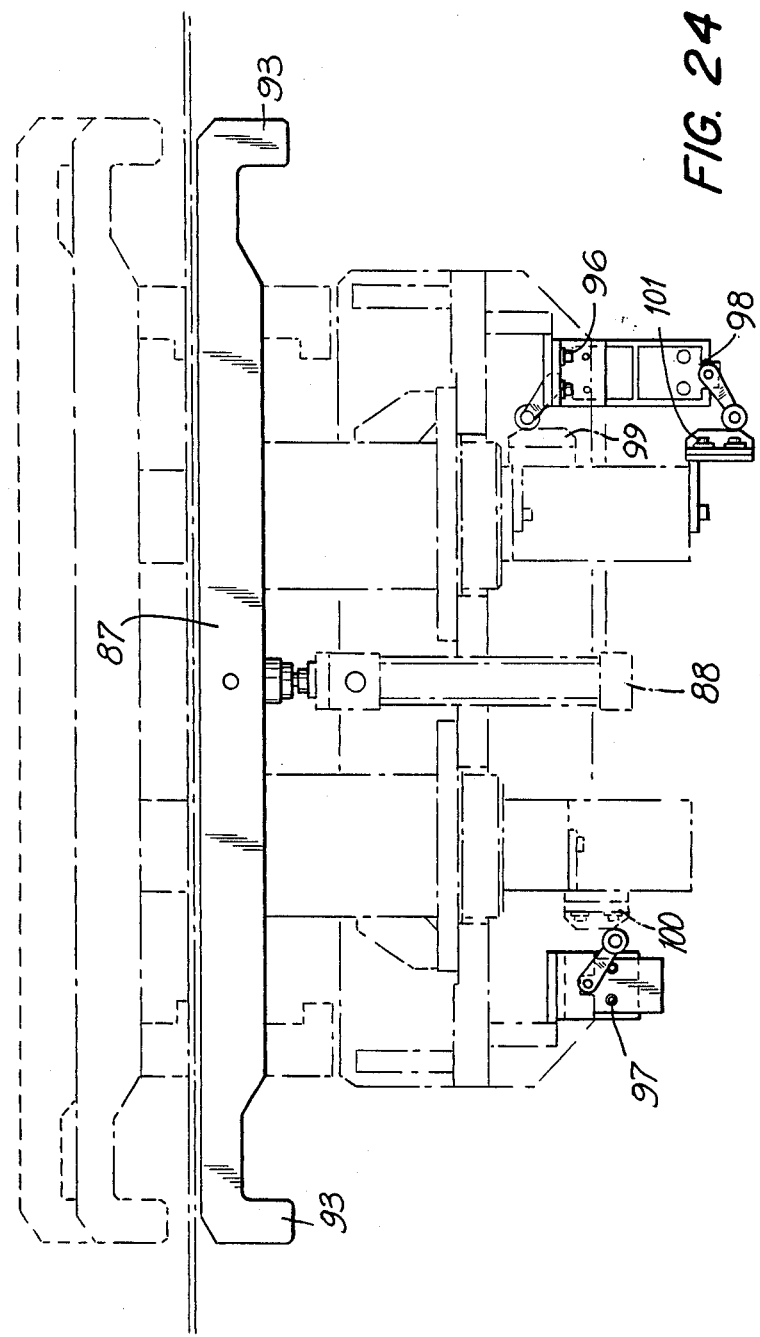
FIG. 24 is an explanatory view showing the operation of a hook body.

The vertical movement of the hook 84 will be explained with reference to FIG. 24.

On the carriage 85 side of the hook 84, there are provided, at three points in the vertical direction, a first limit switch 96, a second limit switch 97, and a third limit switch 98 as lift detecting means. The hook body 87 has a first dog 99, a second dog 100, and a third dog 101, as lift detecting means, for operating the first limit switch 96, the second limit switch 97 and the third limit switch 98 respectively. When the hook body 87 is at the bottom end of stroke (as indicated by a full line), the third limit switch 98 is operated by the third dog 101. Also when the hook body 87 is at the top end of stroke (as indicated by a dotted line), the first limit switch 96 is operated by the first dog 99. Furthermore, when the hook body 87 is in engagement with the long hook hole 15 of the mold 3 (as indicated by an alternate long and two short dashes line), the second limit switch 97 is operated by the second dog 100.

The operation of the above-described mold changer 7 will be explained.

When the mold 3 is brought in, the framework 79 is held in the raised position by the lift cylinder 82. As the carrier 38 of the mold truck 6 moves, the mold 3 guided by the first guide rollers 74 and the third guide rollers 80 passes the first mold receiving table 72, is transferred to the second mold receiving table 73 (in FIG. 19, from the upper level to the lower level), and comes into contact with the stopper rollers 81, thus being positioned and stopped. Then, the mold 3 is positioned in a direction (longitudinal direction) along the rails 2 by a centering stopper 102, and also the framework 79 is lowered by the shift cylinder 82, to support the mold 3 on the second guide roller 75. When the chain 95 is driven by the hook driving motor 94, the hook 84 is moved in the opposite direction (to the right in the drawing) of movement of the mold 3. In the position of the groove section 103, the hook 87 is moved upwardly by the air cylinder 88 until the guide roll 90 is supported by the guide rail 89. The hook 87 is moved to the mold 3 side (to the left), such that the hook section 93 faces the long hook hole 15 of the mounting plate 13. The hook body 87 is slightly lowered until the hook section 93 fits in the long hook hole 15. In this state, when the hook 84 is moved to the left, the mold 3 is moved to the left by the second guide roller 75, being carried into the clamping machine 1. After the mold 3 has been brought in, the hook body 87 is raised to move the hook section 93 away from engagement with the long hook hole 15. Then, the hook 84 is moved to the right.

When, in the position of the groove section 103, the hook body 87 is left lowered, the hook 84 can travel along the guide groove 83 even when the mold 3 is supported on the second guide roller 75. The hook body 87 moving up and down is protected from malfunctioning (e.g., an accidental travel of the hook body 87 when the hook section 93 is moved out of engagement with the long hook hole 15) by the first limit switch 96, the second limit switch 97, the third limit switch 98, the first dog 99, the second dog 100, and the third dog 101.

When the mold 3 is received from the clamping machine 1, the mold 3 is moved by the hook 84 to above the framework 79 by reversing the operation procedure described above, and then the framework 79 is raised to carry the mold 3 onto the carrier 38 of the mold truck 76.

The mold changer 7 described above has the framework 79 vertically movable and having the third guide rollers 80, and the hook 84 for moving the mold 3 along the second guide rollers 75 to the second mold receiving table 73. Therefore, the mold 3 that has been brought in on the first mold receiving table 72 can be conveyed automatically by the hook 84 in a direction crossing at right angles with the direction in which the mold is brought in. Accordingly, it is possible to deliver the mold that has been received from the mold truck 6, to a desired clamping machine 1. Furthermore, the mold 3 can automatically be received from the clamping machine 1 onto the second mold receiving table 73, and delivered from the first mold receiving table 72 to the mold truck 6. That is, it is possible to receive and deliver the mold between the mold truck 6 and the clamping machine 1 all automatically. Accordingly, the mold 3 can be delivered between the first mold receiving table and the mold carrying apparatus. And also, since the mold can be moved crosswise by the delivery mechanism at the second mold receiving table, it is possible to receive and deliver the mold between the second mold receiving table and the molding machine. The mold that has been carried into the first mold receiving table can be sent in a direction crossing at right angles with the direction in which the mold is brought in, and further can be unloaded from the mold carrying apparatus to the molding machine side, thereby facilitating the building of the mold mounting apparatus.

As particularly described above by referring to one embodiment, the mold mounting apparatus comprises a mold holding apparatus for positioning and holding a mold in place; a mold carrying apparatus which travels along the mold holding apparatus and a plurality of molding machines, for receiving and delivering the mold. After the mold is brought into the mold holding apparatus, a subsequent procedure for carrying the mold into, and out of, every molding machine can be performed fully automatically, and, besides, a preheated mold can be fed into the molding machine side. In consequence, it has become possible to improve mold changing operation efficiency, reduce space for the molding process and improve molding operation efficiency because molding can be started immediately after mold replacement.

What is claimed is:

1. A mold mounting apparatus, comprising: a plurality of injection molding machines juxtaposed in a line; rails laid along said injection molding machines; a first mold holding apparatus located on a first side of said injection molding machine at an end of said rails, for positioning and holding a mold; a second mold holding apparatus located on a second side of said injection molding machines opposite said first side and along said rails, for preheating, positioning and holding said mold; a mold carrying apparatus which travels on said rails, and has a carrier for receiving and delivering said mold; and a mold delivery apparatus provided for every two injection molding machines, and each mold delivery apparatus equipped with a mold delivery mechanism for delivering said mold carried by said mold carrying apparatus, to a desired injection molding machine.

2. A mold mounting apparatus as claimed in claim 1, wherein said mold holding apparatus comprises two fixed bases having, on a top surface thereof, first guide members provided to guide said mold being carried in and out of an injection molding machine along a direction in which said mold is carried in and out; a moving base disposed between said two fixed bases and having second guide members which are located on the top surface and vertically movable along a lateral direction of said mold, for guiding said mold in the lateral direction; and a centering mechanism provided on said two fixed bases, for setting a lateral position of said mold by pressing said mold onto a top surface of said moving base that has been raised and for moving said mold on said second guide members.

3. A mold mounting apparatus as claimed in claim 1, wherein said mold carrying apparatus comprises a vehicle body which travels on said rails; a carrier body which is supported on said vehicle body, said carrier body reciprocally moving within a horizontal plane in a direction crossing at right angles with a direction of movement of said vehicle body; and a fork pin disposed in said carrier body and capable of engagement with said mold.

4. A mold mounting apparatus as claimed in claim 1, wherein said mold carrying apparatus has two mold holding stations each comprising a carrier body which is supported on said vehicle body and reciprocally moves within a horizontal plane in a direction crossing at right angles with a direction of travel of said vehicle body, and a fork pin disposed in said carrier body and capable of engagement with said mold.

5. A mold mounting apparatus as claimed in claim 3, wherein said carrier body comprises a pinion train mounted on a side of said vehicle body and driven therefrom; a first fork having, on a bottom surface thereof, a rack in mesh with pinions of said pinion train; a first sprocket and a second sprocket provided at opposite side ends of said first fork; a first anchor and a second anchor provided on an upper surface section of said vehicle body; a second fork movably supported on said vehicle body,; a third anchor and a fourth anchor provided on a bottom surface of said second fork; a first chain connected between said first anchor and said third anchor, and wound around said second sprocket; a second chain connected between said second anchor and said fourth anchor, and wound around said first sprocket; a cylinder mounted on a top surface of said second fork; a pair of third sprockets mounted on a cylinder rod of said cylinder; a carrier movably supported on said vehicle body,; and a third endless chain wound around said third sprocket, secured at one point on the top surface of said second fork, and secured at one point of a bottom surface of said carrier.

6. A mold mounting apparatus as claimed in claim 4, wherein each of said mold holding stations comprises guide rollers provided on a top surface section thereof for guiding said mold with a movement of said carrier body; and a stopper provided on the top surface section, for stopping said mold when said mold has come in contact therewith.

7. A mold mounting apparatus as claimed in claim 3, wherein said vehicle body has running wheels to run on said rails, said running wheels being provided on an outer periphery of said vehicle body, with flange sections formed to ride astride a head of said rails.

8. A mold mounting apparatus as claimed in claim 1, wherein said mold delivery apparatus comprises a first mold receiving table which carries said mold in and out of said mold carrying apparatus; a second mold receiving table associated with said first mold receiving table, movably supporting said mold in a direction crossing at right angles with a direction in which said first mold receiving table carries said mold in and out, and carrying said mold into, and out of, an injection molding machine side; and a mold delivery mechanism which is mounted on said second mold receiving table and driven to deliver said mold.

9. A mold mounting apparatus as claimed in claim 8, wherein said mold delivery apparatus comprises first guide rollers which are provided on a top surface of said first mold receiving table, for guiding said mold in a horizontal direction crossing at right angles with a direction of travel of said mold carrying apparatus; second guide rollers which are provided on a top surface of said second mold receiving table, for guiding said mold along a direction of carriage of said mold carrying apparatus; a stopper roller provided on a top surface of said second mold receiving table for stopping said mold in a predetermined position on said second mold receiving table when said mold guided onto said second mold receiving table has come in contact with said stopper; a guide member vertically movably provided on said first mold receiving table, and coming in line with said first guide rollers at an end of an upward stroke; a lift cylinder for moving said guide member up and down; and a hook provided on said second mold receiving table, for reciprocally moving in a direction along said second guide rollers to move said mold.

10. A mold mounting apparatus as claimed in claim 8, wherein said mold delivery mechanism comprises guide grooves provided in said second mold receiving table and extending in a direction along said second guide rollers; a carriage movably supported with rollers in said guide grooves; a hook driving motor mounted on said second mold receiving table for driving said carriage by a chain; a hook body which is vertically movably supported on said carriage having a hook section formed at each of front and rear sides in a direction of travel, to fit said mold from above; an air cylinder for vertically moving said hook body; and a lift detecting means for detecting a vertically moving state of said hook body.

* * * * *